Patented Mar. 30, 1954

2,673,855

UNITED STATES PATENT OFFICE 2,673,855

PRODIGIOSIN GLUCONATE

Urs F. Nager, Terre Haute, Ind., assignor to Commercial Solvents Corporation, Terre Haute, Ind., a corporation of Maryland No Drawing. Application February 5, 1951,
Serial No. 209,518

1 Claim. (Cl. 260—326.3)

My invention relates to water-soluble forms of the antibiotic prodigiosin. More particularly, it relates to water-soluble salts of prodigiosin and hydroxy acids.

Prodigiosin is a thermo-stable, basic antibiotic material produced in nutrient media by the organism Serratia marcescens. Although prodigiosin has been known for a number of years, its antibiotic properties were not recognized until Hettche (Arch. Hyg. u. Bakt., 107, 348 (1932)) first reported its bacteriostatic activity against Staphylococci and Bacillus anthracis in vitro in 1932. Since that time it has been the subject of considerable study and the structure of the material has been identified as a tripyrryl methene, the empirical formula of which is $C_{20}H_{25}N_3O$ and the structural formula of which is

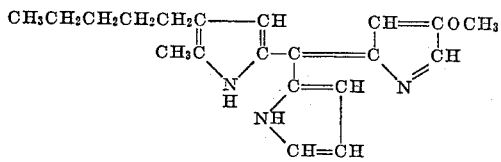

As an antibiotic, prodigiosin is primarily active against Gram-positive organisms but is also active against many Gram-negative organisms such as Neisseria catarrhalis, Pasteurella pseudotuberculosis, etc. It has also been found to possess antifungal activity and to be fungistatic against the organism Coccidioides immitis which causes Coccidioidomycosis or San Joaquin Valley fever.

One of the chief disadvantages in the use of prodigiosin has been the fact that it is practically insoluble in water. For this reason it has been necessary to employ a solvent for prodigiosin other than water when prodigiosin solutions are desired. Most solvents for prodigiosin, however, cannot be used therapeutically due to their toxicity. Furthermore, the in vitro testing of the activity of prodigiosin against microorganisms requires that serial solutions of various concentrations be prepared in order to determine the extent of activity of the material against various microorganisms. In such work, solutions are required wherein the vehicle used displays no activity against the microorganism being tested for susceptibility to prodigiosin.

Thus it can be seen that the therapeutic value of the antibiotic prodigiosin is severely limited due to the insolubility of the material in water. This is especially true in the treatment of diseases requiring relatively high concentrations of the antibiotic in solution form for effective treatment.

I have now discovered that certain salts of prodigiosin are soluble in water in therapeutically effective concentrations. Since these salts retain the therapeutic properties of the base the chief disadvantage in the use of prodigiosin as an antibiotic has been overcome by their use in place of the base.

The compounds of my invention are salts produced by the reaction of prodigiosin with ascorbic, gluconic, lactic and glycollic.

In preparing my new water-soluble prodigiosin compounds, I preferably dissolve the prodigiosin in an aqueous solution of the acid selected. The prodigiosin combines with the acid to form the water-soluble salt which remains in solution in the aqueous medium. In obtaining the solution of the prodigiosin base in the aqueous acid solution, I prefer to heat the mixture to about 70° C. for approximately 10 minutes. In preparing my new salts, I can employ in many cases the lactone form of the acid in forming the aqueous solution but in such event it is necessary to heat the solution in order to convert the lactone into the acid, the lactone ring opening with the application of heat to the aqueous solution. Some hydroxy acids however do not have a lactone form, and the acid itself must be used.

After obtaining the water-soluble salt in aqueous solution in the manner described above, the prodigiosin can be employed therapeutically in such solutions without further treatment. However, whenever the solid salt is preferred I can recover the prodigiosin water-soluble salt in solid form by freeze-drying the aqueous solution under vacuum. The amorphous material obtained is readily soluble in water.

The following examples are offered to illustrate my invention but it will be understood that my invention is not to be considered as being limited thereto, any modifications or equivalents thereof which would ordinarily occur to one skilled in the art being considered as lying within the scope of my invention.

EXAMPLE I

To 20 ml. of each of 1%, 2%, 3%, 4%, and 5% solutions of gluconic acid formed by heating an aqueous solution of δ-gluconolactone, was added 50 milligrams of prodigiosin. The mixtures were heated at 70° C. for 10 minutes and it was noted that all of the prodigiosin was dissolved in the 3% solution of the acid while most of the prodigiosin was dissolved in the 2% solution, the prodigiosin forming the gluconic salt with the gluconic acid present and the salt remaining in solution in the aqueous medium. The 3% solution was subsequently freeze-dried under vacuum and prodigiosin gluconate obtained in amorphous form which was readily soluble in water.

EXAMPLE II

A series of aqueous solutions of various concentrations of organic hydroxy acids was prepared and subsequently the maximum amount of prodigiosin was reacted with the acid in the aqueous solution. The following table gives the results of the experiment which indicate the amount of prodigiosin that can be gotten into aqueous solution using the given concentration of acid.

Table I

| Organic Hydroxy Acid | Percent Aqueous Solution of Acid | Amount Prodigiosin Reacted, mg./ml. |
|---|---|---|
| Ascorbic | 2 | 2.8 |
| Gluconic | 2 | 2.7 |
| Do | 5 | 4.4 |
| Glucuronic | 5 | 0.3 |
| Lactic | 2.5 | 1.9 |

What I claim is:
Prodigiosin gluconate.

URS F. NAGER.

References Cited in the file of this patent

UNITED STATES PATENTS

| Number | Name | Date |
|---|---|---|
| 2,434,039 | Goodings | Jan. 6, 1948 |
| 2,472,453 | Wolf | June 7, 1949 |

OTHER REFERENCES

Welch et al., "Effect of Streptomycin-Bacitracin-Polymyxin Combination, Polymixin B, and Streptomycin with Glucuronolactone on the Intestinal Flora of Man," J. Am. Pharm. Assoc., Scientific Ed., Sept. 1950, pp. 486–489.

Wrede et al., "Uber das Prodigiosin," Berichte, vol 62, 1929, pp. 2678–2685.

Florey et al., "Antibiotics," Oxford Univ. Press, 1949, pp. 559–561, 1572.

Lack, Proc. Soc. Expt. Biol. Med., vol. 72, pp. 656–8 (1949).